Feb. 9, 1932.  F. J. TROLL  1,844,080
ROAD BEARING PRESSURE MEASURING INSTRUMENT
Filed April 27, 1927  3 Sheets-Sheet 2
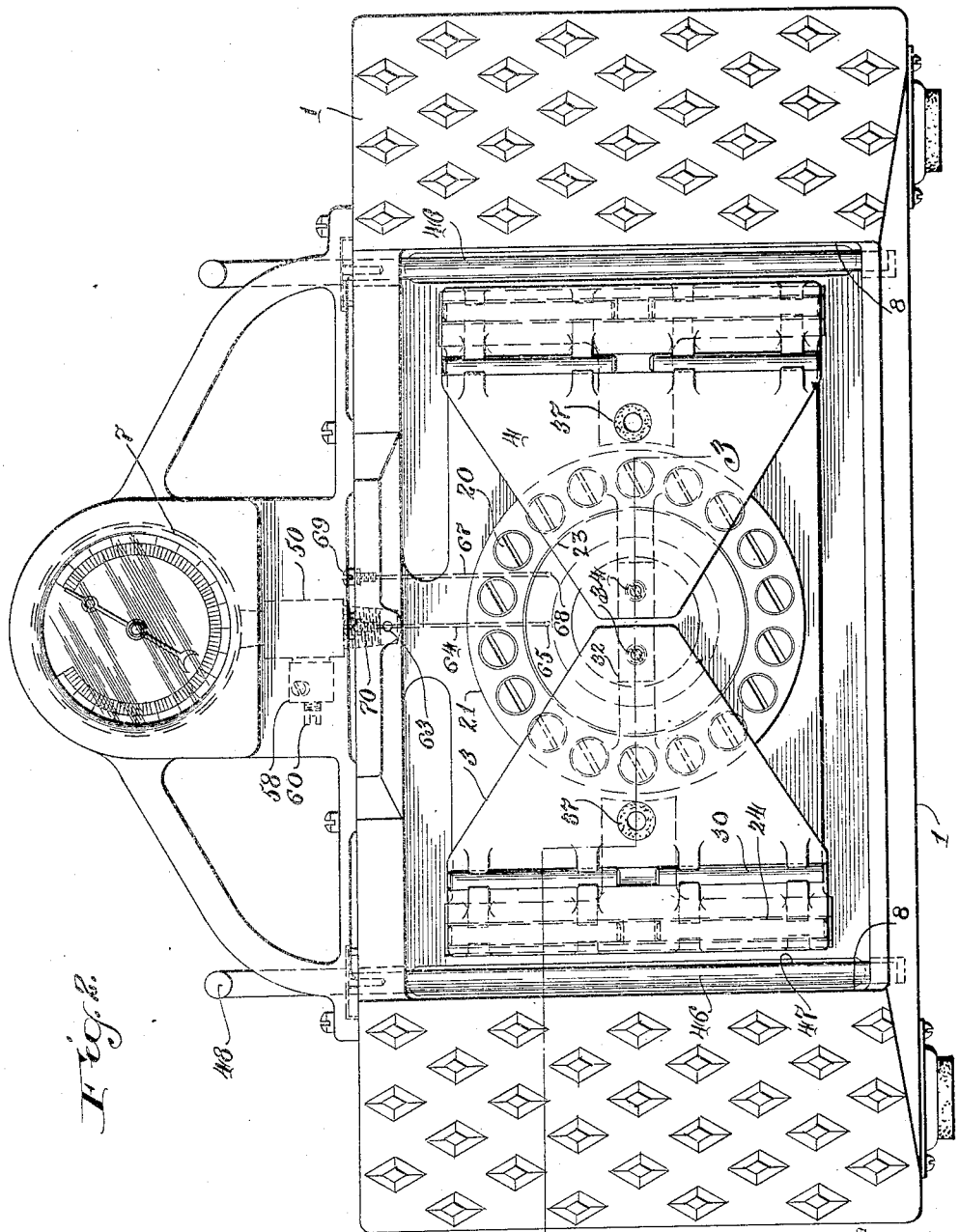

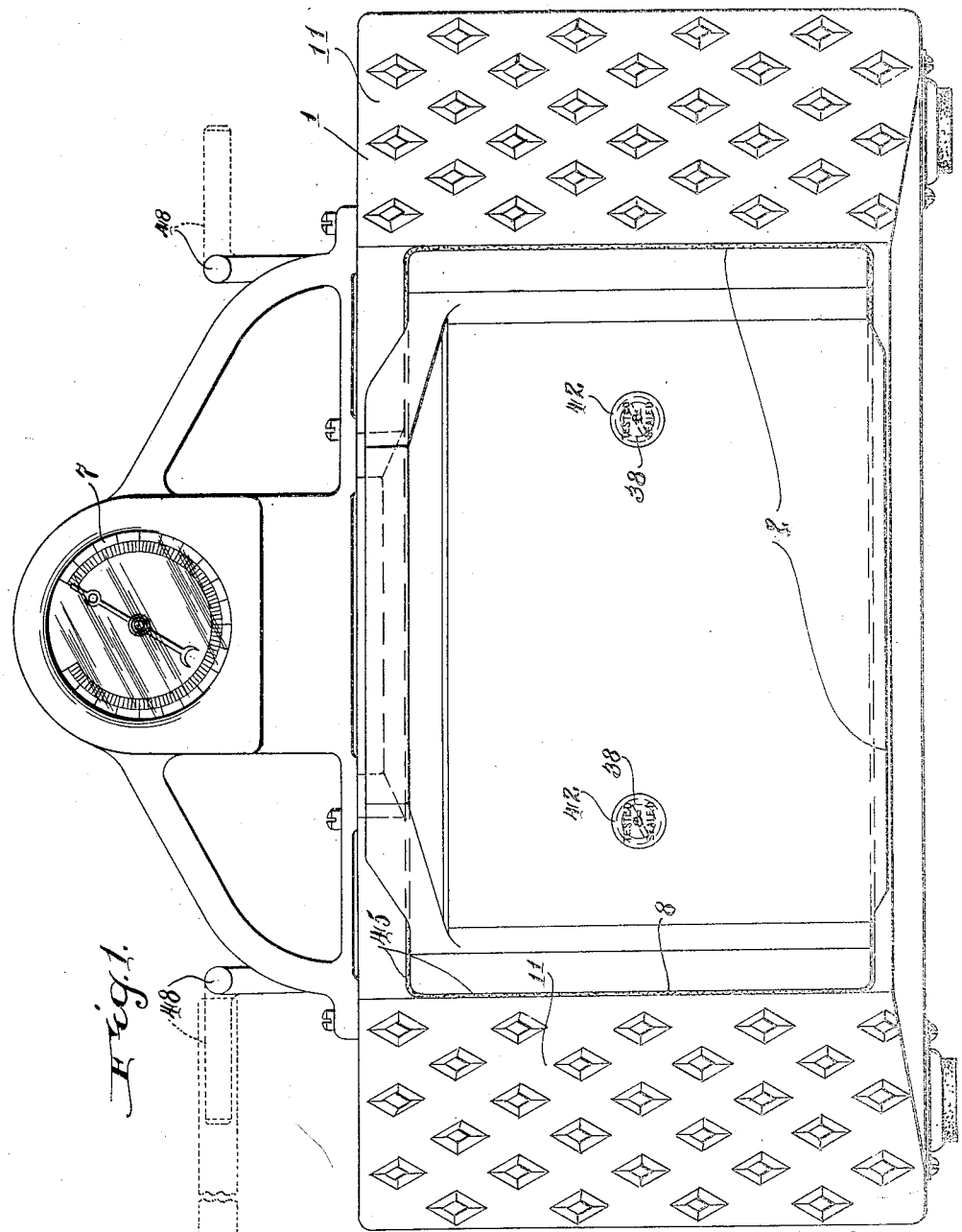

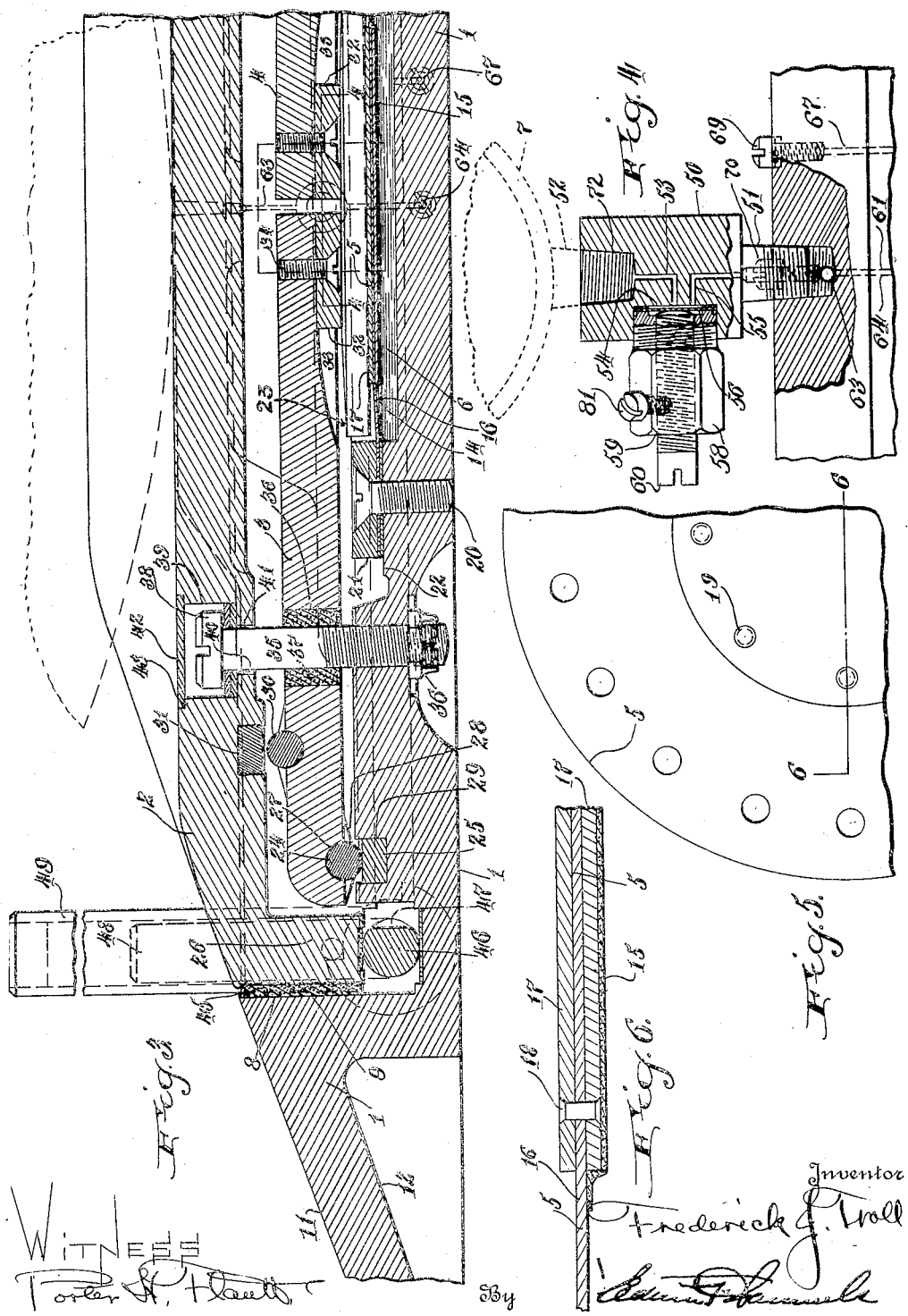

Patented Feb. 9, 1932

1,844,080

UNITED STATES PATENT OFFICE

FREDERICK J. TROLL, OF BALTIMORE, MARYLAND, ASSIGNOR TO LOADOMETER COMPANY, A CORPORATION OF DELAWARE

ROAD BEARING PRESSURE MEASURING INSTRUMENT

Application filed April 27, 1927. Serial No. 136,856.

This application is in part a continuation of my copending application No. 650,326, filed July 9, 1923, road bearing pressure instrument. It relates to the details and features of an improved commercial form of road bearing pressure measuring instrument, the original structure being described and claimed in my United States Patent No. 1,458,920 dated June 12, 1923. The instrument performs the functions of a scale of several tons capacity, but is widely different from anything conceived or constructed in this line prior to the date of the invention described in my aforesaid patent, in that it combines with this high capacity a construction so light that it is easily carried and handled by one man and of such dimensions that it may be placed in the road and the wheel of a truck run onto it without difficulty or inconvenience, so that a determination of the pressure per unit of width and the total weight carried by the vehicle may be accomplished immediately and without difficulty, the present instrument being so devised that it gives an instantaneous reading requiring no adjustment of weights or balancing in connection with its operation.

In the accompanying drawings I have illustrated a road bearing pressure measuring instrument embodying the features of my invention in the preferred form.

In the drawings:

Figure 1 is a top plan view of the instrument completely assembled and sealed.

Figure 2 is a similar view with the platform removed.

Figure 3 is a section on the line 3—3 of Figure 2.

Figure 4 is a section on the line 4—4 of Figure 3.

Figure 5 is a fragmentary plan of the diaphragm removed.

Figure 6 is a section on the line 6—6 of Figure 5.

Referring to the drawings by numerals, each of which is used to indicate the same or similar parts in the different figures, the instrument, as shown, comprises a base member 1, a platform 2 and scale levers 3, 4 transmitting the pressure applied to the platform to a diaphragm 5 supported by fluid 6. The variation of the fluid pressure, due to the action of the levers on the diaphragm, are read in terms of weight or pressure per unit of tire bearing width by means of a gauge 7.

Referring to the structure in detail the base 1 is formed with a central depression or chamber 8 on its upper side, the same having vertical side walls 9 which guide the platform 2.

The base is preferably formed with an incline 11 at each end leading up to the platform 2 and it is shown as cut away beneath the inclines at 12 to dispense with the surplus metal and decrease the weight. The depression 8 is provided at or near its center with a diaphragm chamber 14 containing the pressure transmitting fluid 6, oil being ordinarily used for this purpose.

The diaphragm chamber 14 is closed at the top by means of the diaphragm 5 which, in the preferred form shown, comprises a thin plate 16 of bronze or other suitable metal, the chamber and the plate being preferably circular and the diaphragm plate 16 being stiffened as to its central portion and the pressure on the diaphragm being equalized by means of top and bottom equalizing plates 17 which, as shown, are substantially circular and concentric with the diaphragm chamber 14 and of slightly less diameter so that they leave a margin of the plate 16 which is comparatively flexible around their entire periphery and between the edges of plates 17 and the side walls of the chamber 14.

In the form of the invention shown the equalizing plates 17 are secured to the diaphragm plate 16 by rivets 18 passed through all three plates, the rivets being arranged in a circular line along and parallel to the periphery, the rivet holes being shown in plan at 19 in Figure 5. The assembled diaphragm 5 is sealed, particularly as to the rivet holes and the opening between the lower equalizing plate and the diaphragm plate 16 by means of a sheet of lead 15 which is soldered or otherwise secured to the bottom of the diaphragm plate 16 along the periphery of the lower equalizing plate and outside the same around the entire circumference. The lead plate may, if desired, be soldered or otherwise secured at other convenient points on the bottom surface of the lower plate 17.

The diaphragm 5 is secured in operative position covering the diaphragm chamber by means of screws 20 threaded into the base 1. These screws apply clamping pressure to a clamping ring 21 which bears on the peripheral portion of the diaphragm plate 16 which rests on a circumferential flat surface 22 surrounding the diaphragm chamber and serving as a seat for the diaphragm. In the form shown, the heads of the screws 20 are counter-sunk in the ring 21. Resting on the diaphragm 5 and fitting loosely inside the ring 21 is a relatively thick stiff circular pressure plate 23 which is preferably of steel.

The pressure applied to the platform 2 is transmitted to the diaphragm by means of scale levers 3 and 4. These, in the form of the invention shown, are of substantially triangular shape so that the platform pressure is distributed over a considerable area and the levers are of great strength but comparatively small vertical dimension. These levers are supported and fulcrumed at their outer ends upon hardened rollers or pins 24 serving the purpose of knife edges seated in the bottom surfaces of the levers and extending across substantially the entire width and resting on corresponding hardened blocks 25 seated in the base, it being understood that the levers are disposed in the chamber or cavity 8 in the base beneath the platform the latter being chambered as to its lower surface to provide for the levers, the end portions of the platform beyond the levers being offset downwardly as shown at 26.

In the form of the invention shown, the fulcrum rollers or pins are seated in grooves 27 in the levers and are burred in, the burred metal being shown at 28. The hardened fulcrum blocks 25 are forced into grooves 29 in the base, or otherwise secured in any suitable manner. The pressure applied to the platform 2 is transmitted to the levers 3 by way of hardened rollers or pins 30 spaced inwardly from the rollers or pins 24 and seated in suitable grooves in the levers and preferably burred in as previously described, and the platform is provided with hardened blocks 31 seated therein and engaging and cooperating with the rollers or pins 30. The pressure thus applied to the scale levers 3, 4 is transmitted by them to the central portion of the diaphragm 5 by means of presser members 32 at the ends of the levers shown as removable. The members 32 bear directly on the pressure plate 23. The members or blocks 32 are preferably seated in grooves 33 formed centrally of the end portions of the levers on the bottom sides and extending in the direction of their radii. The grooves 33 are at the ends of the levers and the blocks may be introduced from the ends of the grooves and held by screws 34 which are counter-sunk in the blocks and threaded upwardly into the ends of the levers.

The scale levers 3 and platform 2 are guided and secured to the platform by bolts or studs 35 threaded into the base and held by lock nuts 36. To insure freedom of motion of the levers relative to the guide bolts 35, the opening 36 in each respective lever through which the bolt 35 is passed is made much larger than the bolt and pushed with rubber at 37, so that all possibility of binding or cramping of the parts at this point are eliminated. The bolts are set to permit free action of the levers and the heads 38 of the bolts are shown as seated in suitable counter-sinks 39 extending downwardly from the top of the platform from which the bolts pass through holes 40 slightly larger than the diameter of the bolts. Washers 41 are shown in the counter-sink 39 beneath the bolt heads and the counter-sinks, as shown, are of extra depth permitting the bolt heads to lie below the level of the platform and the counter-sinks are preferably closed by means of disks 42 pressed into the openings which are enlarged at 43 for this purpose. The disks, as shown, are marked "tested and sealed", being sealed in this way to prevent removal of the platform and alteration of the adjustment by unauthorized persons, and tampering with the instrument and consequent loss of accuracy.

It is of particular importance to note that all of the bearing points of the levers and cooperating parts which are subject to wear are armed with hardened metal members which resist wear to the last extreme and are further adapted to easy renewal.

Reference has already been made to the operation of the platform 2 in the chamber or aperture 8 in the base 1. In the preferred form of the invention shown, the platform 2 fits freely within the aperture 8 in the base, excessive clearance being provided, and the platform is faced with rubber at 45 which takes up the clearance, excludes grit in the form of sand, gravel, dirt, etc., and at the same time eliminates all tendency to bind or cramp.

In the illustration, Figure 3, the platform is supported in elevated position by eccentric 46 rotated to supporting position by means of arm 48, there being such an eccentric and arm at each end of the machine. The leverage of these arms may be increased by means of extension arms in the form of tubes or pipes 49 which take over and receive the arms 48, the same being shown broken away in Figure 3. The object of so supporting the platform is somewhat different from that of the ordinary scale lock, which is used to protect the mechanism when inoperative. The object of the present device is to provide a rigid support for the platform, keeping the weight of the vehicle, as to which the test is being made, off of the diaphragm until the vehicle wheel has reached a fixed position on the platform. This protects the hydraulic element from the impact of the weight of the vehicle as it rides up onto the platform and eliminates the inaccuracies which would obviously result from such impact.

The gauge or indicator 7 is connected to a fitting 50 which is provided with a nipple 51 which is in turn threaded into the side of the base 1. In the form shown the gauge has a nipple 52 which is threaded into the fitting 50. The fitting 50 has a passage 53 which leads to a valve chamber 54 in the side of the fitting and the valve chamber is connected to the nipple 51 which is screwed into the base by a passage 55. The passages 53 and 55 enter the valve chamber 54 at adjacent points on one side and both passages are closed by a valve disk 56. The valve chamber is closed above the valve by a screw plug 58 and the plug has a central axial threaded opening 59 in which is a screw 60 which controls the valve, the same being closed by turning the screw up tightly against the valve. When the screw is loosened the valve is permitted to open. The screw 60 is locked in adjusted position by a lateral screw 81 entering passage 59.

From the nipple 51 a passage 61 leads through the base 1 to the diaphragm chamber 14. In the form shown this passage is formed by boring a hole 63 vertically downward from the top of the base and intersecting the passage in nipple 51 and extending below the same. The top opening of this hole is plugged. A hole 64 is then covered horizontally intersecting the passage 63 and extending beneath the chamber and a hole 65 is bored from the bottom of the chamber intersecting the hole 64. An air exhaust or relief passage 67 is also provided. This enters the base at the side and extends horizontally beneath the chamber 14, from which chamber a vertical hole 68 is drilled downwardly intersecting the horizontal hole. The two holes thus drilled form passage 67. The passage 67 and the lower horizontal bore 64 are closed by screws 69 and 70 threaded into the ends or openings of same at the end of the base. The said openings are shown as enlarged and tapped for this purpose.

The diaphragm chamber is filled by way of the gauge opening, the gauge being removed and the opening 67 being used as an air vent, the screw plug 69 being removed for this purpose. The diaphragm chamber is preferably filled with oil or other suitable fluid at a pressure of five or ten pounds, or any pressure which is found convenient and desirable. The air is expelled through passage 67 and the screw is, of course, replaced before the pressure rises.

When the desired pressure is obtained the valve screw 60 is tightened, closing valve 56 and the gauge 7 being filled with oil its nipple 52 is screwed into threaded opening 72 in fitting 50. Care is taken to exclude the air and to enter the gauge oil to oil. For machines of different capacity gauges of different capacities are used, but a special gauge of sufficient range might be constructed to provide a wide variation in a single instrument. At present a one hundred twenty-five pound gauge is used for loads up to seven thousand pounds, a two hundred fifty pound gauge for loads above seven thousand pounds to and near fifteen thousand pounds, and a three hundred pound gauge for loads from fifteen thousand pounds to twenty thousand pounds.

I have thus described specifically and in detail a load bearing pressure measuring instrument embodying the features of my invention in the preferred form in order that the nature and operation of the same may be clearly understood, however, the specific terms herein are used descriptively rather than in a limiting sense, the scope of the invention being defined in the claims.

What I claim as new and desire to secure by Letters Patent is:

1. A road bearing pressure measuring instrument which is manually portable and of short vertical dimension whereby it is adapted to be placed on a road surface so that a wheel of a vehicle can be run onto it, comprising a base having a central aperture, a platform in said aperture, flat laterally extended scale levers beneath the platform, fulcrum means supporting the ends of the levers near the ends of said aperture, bearing means for the platform and corresponding bearing means on the levers spaced inwardly from the fulcrum points, a diaphragm chamber and diaphragm beneath the center of the platform, means at the ends of the levers near the center of the platform bearing on the diaphragm near the center, and means for indicating the pressure on the diaphragm.

2. A road bearing pressure measuring instrument which is manually portable and of short vertical dimension whereby it is adapted to be placed on a road surface so that a wheel of a vehicle can be run onto it, comprising a base having a central aperture, a platform in said aperture, flat scale levers beneath the platform, fulcrum means supporting the ends of the levers near the ends of said aperture, bearing means for the platform and corresponding bearing means on the levers spaced inwardly from the fulcrum points, a diaphragm chamber and diaphragm beneath the center of the platform, means at the ends of the levers near the center of the platform bearing on the diaphragm near the center, and means for indicating the pressure on the diaphragm, the fulcrum means, bearing means and diaphragm engaging means being hardened removable members capable of replacement.

3. A road bearing pressure measuring instrument which is manually portable and of short vertical dimension whereby it is adapted to be placed on a road surface so that a wheel of a vehicle can be run onto it, comprising a base having a central aperture, a platform in said aperture, and means for indicating the pressure on the platform, the platform having a considerable clearance in the aperture in the base and soft packing means closing said clearance.

4. A road bearing pressure measuring instrument which is manually portable and adapted to be placed on a road surface so that a wheel of a vehicle can be run onto it, comprising a base, a platform, a lever beneath the platform, fulcrum means supporting the lever, the platform bearing on the lever at a point spaced inwardly from the fulcrum point, indicating means, and means for securing the scale beam in position in the form of a bolt extending downward through the platform and through the lever and seated in the base.

5. A road bearing pressure measuring instrument which is manually portable and adapted to be placed on a road surface so that a wheel of a vehicle can be run onto it, comprising a base, a platform, a lever beneath the platform, fulcrum means supporting an end of the lever, the platform bearing on the lever at a point spaced inwardly from the fulcrum point, a diaphragm chamber and diaphragm beneath the platform, the opposite end of the lever bearing on the diaphragm near the center, means for indicating the pressure in the diaphragm, and means for securing the lever in position in the form of a bolt extending downward through the platform and through the lever and seated in the base, the platform having a countersunk chamber enclosing the bolt head and sealing means for said chamber to prevent access to the bolt.

6. A road bearing pressure measuring instrument which is manually portable and adapted to be placed on a road surface so that a wheel of a vehicle can be run onto it, comprising a base, a platform, a laterally extended lever beneath the platform, fulcrum means supporting an end of the lever, bearing means for the platform and corresponding bearing means on the lever spaced inwardly from the fulcrum point, a diaphragm chamber and diaphragm beneath the platform, means at the opposite end of the lever bearing on the diaphragm near the center, means for indicating the pressure in the diaphragm, and means for securing the lever in position in the forming of a bolt extending downward through the platform and through the lever and seated in the base, the lever being formed with excessive clearance around the bolt and a soft bushing for said clearance.

7. A road bearing pressure measuring instrument of short vertical dimension, manually portable, and adapted to be placed on a road surface so that a wheel of a vehicle can be run onto it, comprising a base, a platform, a scale lever beneath the platform, fulcrum means supporting an end of the lever, the platform bearing on the lever at a point spaced inwardly from the fulcrum point, a diaphragm chamber and a diaphragm beneath the center of the platform, the swinging end of the lever near the center of the platform bearing on the diaphragm near the center, and fluid means for indicating the pressure on the diaphragm, the diaphragm comprising a flexible metal plate and a relatively rigid plate secured to the flexible plate covering the central portion thereof and spaced inwardly from the edges of the flexible plate.

8. A road bearing pressure measuring instrument of short vertical dimension, manually portable and adapted to be placed on a road surface so that a wheel of a vehicle can be run onto it, comprising a base, a platform, a lever beneath the platform, fulcrum means supporting an end of the lever, the platform bearing on the lever at a point spaced inwardly from the fulcrum point, a diaphragm chamber and diaphragm beneath the platform, the other end of the lever bearing on the diaphragm near the center, means for indicating the pressure in the diaphragm, a metal ring surrounding the diaphragm chamber, the edges of the diaphragm extending beneath the ring, and means clamping the ring to the base compressing the edge portion of the diaphragm and holding it in position.

9. A road bearing pressure measuring instrument which is manually portable and of short vertical dimension so that it is adapted to be placed on a road surface so that a wheel of a vehicle can be run onto it, comprising a base, a platform, a lever beneath the platform, a fulcrum supporting an end of the lever, the platform bearing on the lever at a point spaced inwardly from the fulcrum point, a diaphragm chamber and diaphragm beneath the platform, the swinging end of the lever bearing on the diaphragm, means for indicating the pressure on the diaphragm, the diaphragm consisting of a flexible plate secured at its edges to the periphery of the diaphragm chamber, and stiffening means for the plate comprising two smaller metal plates secured to the central portion of the diaphragm plate on opposite sides thereof.

10. A road bearing pressure measuring instrument which is manually portable and adapted to be placed on a road surface so that a wheel of a vehicle can be run onto it, comprising a base, a platform, a lever beneath the platform, fulcrum means supporting an end of the lever, the platform bearing on the lever at a point spaced inwardly from the fulcrum point, a diaphragm chamber and a diaphragm, at the other end of the lever bearing on the diaphragm, fluid means for indicating the pressure on the diaphragm, the diaphragm consisting of a flexible plate secured at its edges to the periphery of the diaphragm chamber, stiffening means for the plate comprising two smaller metal plates secured to the central portion of the diaphragm plate on opposite sides thereof, the securing means extending through all three plates and sealing means covering the central portion of the diaphragm including the bottom plate and a margin surrounding the same, said sealing means being in the form of relatively soft material secured to the diaphragm plate.

11. A road bearing pressure measuring instrument of short vertical dimension, manually portable and adapted to be placed on a road surface so that a wheel of a vehicle can be run onto it, comprising a base, a platform, the base being apertured to receive the platform and the platform being apertured from beneath, a scale lever in said platform aperture, fulcrum means for the lever at one end, a diaphragm chamber in the base beneath the opposite end of the lever, a diaphragm for said chamber, the platform bearing on the lever at a point spaced from the fulcrum, means at the opposite end of the lever bearing on the diaphragm, means securing the sale level and platform comprising a bolt extending through the platform and through the lever and secured to the base, the lever being apertured to permit the bolt to pass freely therethrough.

12. A road bearing pressure measuring instrument of short vertical dimension, manually portable and adapted to be placed on a road surface so that a wheel of a vehicle can be run onto it, comprising a base, a platform, a scale lever beneath said platform, means securing the scale lever and platform comprising an upright bolt extending through the platform and through the lever and seated in the base, the lever being apertured to permit the bolt to pass freely therethrough, means for taking up the play of the lever relatively to the bolt comprising relatively soft bushing in the opening in the lever around the bolt.

13. A road bearing pressure measuring instrument comprising a base, a platform, the base being apertured to receive the platform, scale levers beneath the base fulcrumed at their respective ends, a diaphragm chamber in the base beneath the free ends of the levers, a diaphragm for said chamber, means on the platform spaced away from the fulcrum and bearing on the levers, means at the free ends of the levers bearing on the diaphragm, means securing the scale levers and platform comprising bolts extending through the platform and through the levers and seated in the base, the lever being apertured to permit the bolts to pass freely therethrough, the platform being chambered to admit the heads of the bolts and the chambers being sealed to prevent unauthorized change of adjustment.

14. In a manually portable road bearing pressure measuring instrument, a base and moving platform, said construction being of short vertical dimension so that the instrument may be placed on the road surface and the wheel of the vehicle run onto it, yielding means with means for communicating the pressure on the platform to the said yielding means, means for indicating the load, and means for locking the platform in elevated position to protect the yielding means from the impact of the wheel as it rides onto the platform.

15. A road bearing pressure measuring instrument comprising a base having a guiding aperture, a platform fitting freely in the aperture and having guiding surfaces cooperating with the guiding surface of the guiding aperture, load measuring mechanism supporting the platform and a soft packing between the cooperating guiding surfaces.

16. A road bearing pressure measuring instrument comprising a base having an aperture, a platform operating in said aperture, load measuring apparatus supporting the platform, the base having guiding means for the platform and the platform having cooperating guiding portions and soft packing between the guiding portions of the platform and the guiding means of the base, the said surfaces being spaced apart to provide for the packing which serves to exclude dirt and grit from the weighing mechanism.

17. A road bearing pressure measuring instrument comprising a base having an aperture for a platform, a platform in said aperture and load measuring apparatus beneath and supporting the platform and fitting freely therein, the platform being provided with an encircling rubber band enclosing the platform and interposed between the surface of the platform and the surface of the guiding aperture preventing the entrance of grit into the weighing mechanism.

18. In a road bearing pressure measuring instrument of short vertical dimension, manually portable and adapted to be placed on a road surface so that a wheel of a truck can be run onto it, comprising a base, lever means fulcrumed near the ends of the base, a platform resting on said lever means at points spaced slightly inwardly from the fulcrum, a diaphragm chamber in the base and containing fluid, a diaphragm bearing on the fluid, a pressure plate resting on the diaphragm, the lever means bearing on said pressure plate as to the end portion thereof opposite the fulcrum, a ring bearing on the edge of the diaphragm which overlies the edge of the diaphragm chamber, means securing said ring and holding the diaphragm in position, said ring serving as a guide for the pressure plate which fits loosely therein.

19. A road bearing pressure measuring instrument which is manually portable and adapted to be placed on a road surface so that the wheel of a vehicle can be run onto it comprising a base, a platform, a diaphragm chamber, a diaphragm covering the chamber, fluid means beneath the diaphragm to be engaged thereby, means for indicating the pressure of the fluid, the diaphragm including a stiffening member at the center and a pressure member bearing on the diaphragm, and means transmitting the weight on the platform to the pressure member.

20. A road bearing pressure measuring device consisting of a portable dynamometer of short vertical dimension adapted to be placed in the roadway so the vehicle wheel can be run onto it, comprising a platform, a plurality of levers beneath said platform, a support for each said lever, providing for the swing of each lever about an axis approximately beneath an end of said platform, the said axes being at opposite ends of the platform, means for supporting the respective ends of the platform, said supporting means in each instance having a line of contact with the lever parallel to the axis thereof, the spacing of said contacting lines from said axes being substantially equal as to the respective levers, a resilient support for the other ends of said levers equally spaced from th axes of said levers, the support consisting of a closed container for fluid, a diaphragm resting thereon, a rigid member resting on the diaphragm and supporting the swinging ends of the levers.

21. A road bearing pressure measuring device consisting of a manually portable dynamometer of short vertical dimension adapted to be placed in the roadway so that a vehicle wheel can be run onto it, comprising a platform, a plurality of levers beneath said platform, a support for each said lever, providing for the swing of each lever about an axis approximately beneath an end of said platform, the said axes being at opposite ends of the platform, means for supporting the respective ends of the platform, said supporting means in each instance having a line of contact with the lever parallel to the axis thereof, the spacing of said contacting lines from said axes being substantially equal as to the respective levers, a resilient support for the other ends of said levers, equally spaced from the axes of said levers, said resilient support including a closed container, and a liquid under pressure therein, said container having a moving wall of a substantially rigid construction on which said lever ends bear, means for reading the variations in pressure of the fluid within said support.

22. A road bearing pressure measuring device consisting of a manually portable dynamometer of short vertical dimension adapted to be placed in the roadway so that a vehicle wheel can be run onto it, comprising a platform, levers pivoted to swing in a vertical plane, said levers being immediately beneath said platform, the axes of the respective levers being adjacent the ends of the platform, a support for each end of the platform engaging the respective levers adjacent their axes, the supports at the respective ends being slightly spaced inwardly from said axes toward the center of the platform, a base for said apparatus, and a flat diaphragm chamber in said base beneath the center portion of said platform, fluid in said diaphragm chamber, a diaphragm covering the top of said chamber, rigid equalizing means supporting the inner ends of said levers on said diaphragm, and means for reading the pressure of the fluid in said diaphragm chamber.

23. A road bearing meter comprising a platform, levers pivoted to swing a vertical plane, said levers being immediately beneath said platform, the axes of the respective levers being adjacent the end of the platform and the swinging ends of the levers beneath the middle of the platform, a support for each end of the platform engaging the respective levers adjacent their axes, the supports at the respective ends being spaced inwardly from said axes toward the center of the platform, a base for said apparatus, and a diaphragm chamber in said base, beneath the center portions of said platform, a fluid in said diaphragm, a diaphragm covering the top of said chamber, and means supporting the inner ends of said lever on said diaphragm, means for reading the pressure of the liquid in said diaphragm chamber, said levers being substantially triangular, the vertices being at the center.

24. A road bearing meter comprising a platform, levers pivoted to swing in a vertical plane, said levers being immediately beneath said platform, the axes of the respective levers being adjacent the end of the platform, the swinging ends of the levers being beneath the middle of the platform, a support for each end of the platform engaging the respective levers adjacent their axes, the supports at the respective ends being spaced inwardly from the axes toward the center of the platform, a closed flat diaphragm chamber beneath the center portions of said platform, fluid in said diaphragm chamber, a diaphragm covering the top of said chamber, and rigid means supporting the inner ends of said levers on said diaphragm, means for reading the pressure of the fluid in said diaphragm chamber, means for securing the platform and the levers at the ends of the platform consisting of a bolt passing through the platform vertically and through the levers, and seated in the base, the platform and the levers being apertured to admit the bolt providing for play of said parts relatively to the bolts to prevent cramping.

Signed by me at Baltimore city, State of Maryland, this 25th day of April, 1927.

FREDERICK J. TROLL.